United States Patent [19]

Lim

[11] Patent Number: 4,712,002

[45] Date of Patent: Dec. 8, 1987

[54] IMAGING SYSTEMS EMPLOYING APPARATUS FOR EVENLY ILLUMINATING OBJECTS TO BE SCANNED

[75] Inventor: Tuan-Kay Lim, Waterloo, Canada

[73] Assignee: NCR Corporation, Dayton, Ohio

[21] Appl. No.: 917,332

[22] Filed: Oct. 9, 1986

[51] Int. Cl.[4] .......................... G03B 27/54; H01J 3/16

[52] U.S. Cl. .................................... 250/216; 350/619; 362/298; 362/346

[58] Field of Search ................ 250/216; 350/619, 625, 350/628; 362/297, 298, 346, 347, 361

[56] References Cited

U.S. PATENT DOCUMENTS

| | | | |
|---|---|---|---|
| 4,473,865 | 9/1984 | Landa | 362/298 |
| 4,506,152 | 3/1985 | Gupta | 250/216 |
| 4,518,249 | 5/1985 | Murata et al. | 362/346 |

*Primary Examiner*—Edward P. Westin

*Assistant Examiner*—Khaled Shami

*Attorney, Agent, or Firm*—Wilbert Hawk, Jr.; Albert L. Sessler, Jr.; Elmer Wargo

[57] ABSTRACT

An imaging system employing an apparatus for evenly illuminating objects to be scanned. The apparatus includes first and second elliptical cylindrical sections which comprise an elliptical cylindrical mirror having first and second focal lines. A linear-type lamp is located at the first focal line and the scanning line of the imaging system is located at the second focal line. First and second planar mirrors are positioned in parallel relationship to each other at the top and bottom of the scanning line, and a non-reflecting surface on the second elliptical cylindrical section combines with the first elliptical section to provide an even distribution of light at the scanning line. The optical axis of the imaging system passes between the first and second elliptical cylindrical sections.

16 Claims, 9 Drawing Figures

IMAGING SYSTEMS EMPLOYING APPARATUS FOR EVENLY ILLUMINATING OBJECTS TO BE SCANNED

BACKGROUND OF THE INVENTION

This invention relates generally to a system for imaging objects to be scanned, and in particular, it relates to a high-speed, document-imaging system which utilizes an apparatus for evenly illuminating the documents being scanned.

Today, there is an increasing trend to automate the processing of documents, as for example, the processing of checks and related documents in a financial environment. Part of this processing relates to "imaging" documents as they are moved along a document track. The images of the documents are then viewed, sequentially, on a video terminal where an operator performs data completion, such as "keying in" the monetary amounts for individual checks, for example.

The imaging of the documents is generally performed by scanning a portion of a document along a scanning line as the document is moved in a document track. The scanning line is illuminated, and an optical system is used to direct the light reflected from the document at the scanning line to a light-sensitive detector. The detector is generally a light-sensitive, solid-state array which may include for example, 1024 pixels (picture elements or individual detectors) which are aligned in a vertical column. The length of the column or array is generally slightly longer than one inch while the length of the scanning line is slightly longer than four inches to accommodate the variety of checks to be processed as received at a bank. The individual detectors in the array produce a gray scale value which corresponds to the associated portion of the document at the scanning line. The gray scale values may be one of 64 values ranging from pure white to solid black, for example. These gray scale values are "thresholded" by additional processing circuitry by converting the gray scale value of an individual pixel into either a binary zero (white) or a binary one (black), for example. The binary values for the pixels in a scanning line are stored in a memory along with the data for other scans which comprise the image data for the entire document. The image data for a document is then withdrawn from memory and "reconstituted" to present an image of the document on a video terminal for use as earlier described herein.

In order to have accurate thresholding of data from the system described, it is very important to have the scanning line illuminated by an even intensity of light over the entire length of the scanning line. Uneven lighting at the scanning line complicates the thresholding circuitry and produces inaccurate or incomplete images of the documents when displayed on a video terminal.

SUMMARY OF THE INVENTION

Accordingly, an object of this invention is to provide a low-cost apparatus which will evenly illuminate an object over a predetermined length of the object.

Another object is to provide a low-cost system for imaging documents which will evenly illuminate a scanning line where a portion of the document is imaged while moving the document in a document track.

In one embodiment of the invention, the apparatus includes a scanning plane having a scanning line therein. The apparatus also includes an elliptical cylindrical mirror having first and second focal lines and which is made up of a first elliptical cylindrical section having the first focal line adjacent thereto and a second elliptical section having the second focal line adjacent thereto. First and second planar mirrors located in spaced parallel relationship at opposed ends of the scanning line are positioned perpendicular to the scanning plane. The first and second elliptical cylindrical sections are positioned relative to the scanning plane to enable the second focal line of the cylindrical elliptical mirror to be substantially coincident with the scanning line at the scanning plane. The second elliptical cylindrical section has a non-reflecting area located substantially at the center thereof as measured along the length of the second focal line. A linear-type source of illumination is positioned at the first focal line.

In another embodiment of the invention, the invention relates to a system for imaging documents in a scanning plane having a scanning line therein and means for presenting a document to be imaged at the scanning plane. The system includes an elliptical cylindrical mirror having first and second focal lines and which is made up of a first elliptical cylindrical section having the first focal line adjacent thereto and a second elliptical section having the second focal line adjacent thereto. First and second planar mirrors located in spaced parallel relationship at opposed ends of the scanning line are positioned perpendicular to the scanning plane. The first and second elliptical cylindrical sections are positioned relative to the scanning plane to enable the second focal line of the cylindrical elliptical mirror to be substantially coincident with the scanning line at the scanning plane. The second elliptical cylindrical section has a non-reflecting area facing the second focal line and being located substantially at the center thereof as measured along the length of the second focal line. A linear-type source of illumination is positioned at the first focal line. The system also includes an optical axis which is located substantially perpendicularly to the scanning plane at the scanning line and passes between the first and second elliptical cylindrical sections. The system further includes a light array located on the optical axis and a lens system located on the optical axis for directing light reflected from the document along the scanning line to the light array.

This invention provides a low-cost apparatus for evenly illuminating a scanning line for objects to be scanned and also provides a low-cost system for imaging documents.

The advantages and features of this invention will be better understood in connection with the following specification, claims and drawing.

DETAILED DESCRIPTION OF THE INVENTION

Figure 1:
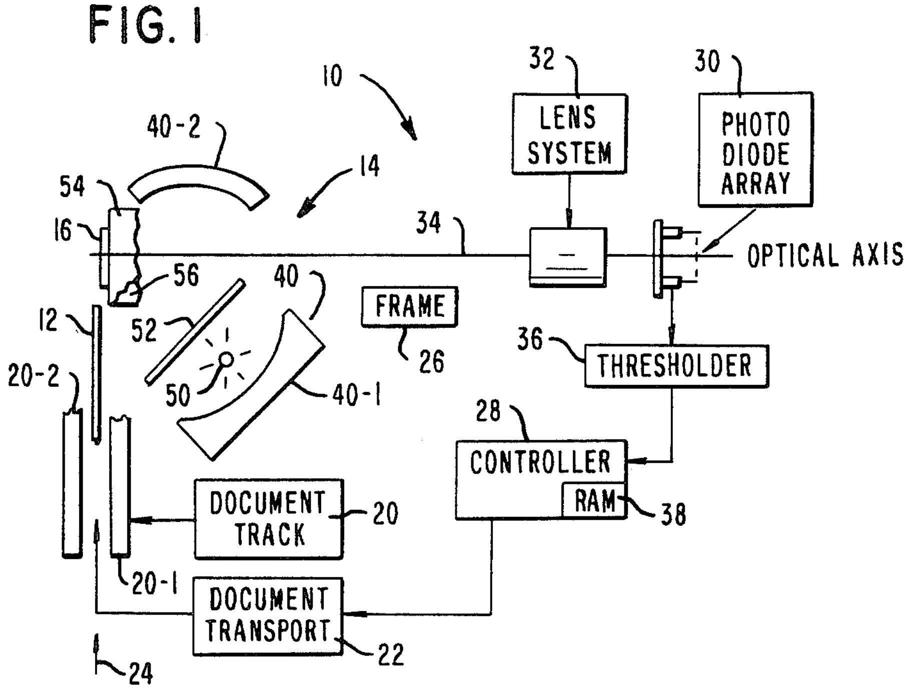
FIG. 1 is a schematic diagram showing a plan view of the document imaging system of this invention which incorporates an apparatus for evenly illuminating the document.

FIG. 1 shows a plan view, in diagrammatic form, of an imaging system 10 made according to a preferred embodiment of this invention. The imaging system 10 chosen to portray this invention is a system for imaging documents (like document 12) which documents are processed by banks or other financial institutions.

The imaging system 10 includes an illuminating apparatus which is designated generally as 14. The apparatus 14 includes a scanning plane 16 which is shown in exaggerated size in FIGS. 1 and 2, with a scanning line 18 being shown only in FIG. 2. The scanning line 18 is the line along which the scanning or imaging is effected; however, before discussing the apparatus 14 in further detail, it appears appropriate to discuss the general functioning of the system 10.

The system 10 (FIG. 1) includes means for presenting documents to the scanning line 18, which presenting means includes a document track 20 to align the document 12 with the scanning plane 16, and the presenting means also includes a document transport 22 which moves the documents sequentially in the direction of arrow 24 in the document track 20 to the scanning line 18. The document track includes the vertically-positioned side walls 20-1 and 20-2 which are secured to the frame 26, shown only schematically in FIG. 1. The document 12 is moved on its long, lower edge, with the top, long edge of the document 12 being shown in FIG. 1. The document transport 22 is conventional, and it is conventionally controlled by the controller 28.

As a document 12 is moved to the scanning line 18 in the scanning plane 16, it is illuminated by the illuminating apparatus 14. When the leading edge of a document 12 is detected at the scanning plane 16 (through suitable detectors not shown), this fact is used by the controller 28 to start accepting data from the photodiode array 30. Light reflected from the scanning plane at the scanning line 18 is directed by the lens system 32 along the optical axis 34 to the photodiode array 30 as discussed earlier in the Background of the Invention. As the document 12 is moved in the direction of arrow 24 by the document transport 22, successive scans of data are recorded by the array 30. The gray scale value for each pixel in the array 30 is converted into either a binary one (black) or a binary zero (white) by the thresholder 36, and the resulting binary image data is stored in the RAM 38 associated with the controller 28. Successive scans of data for a document 12 are similarly processed and stored in the RAM 38.

The illuminating apparatus 14 (FIGS. 1, 2) alluded to earlier herein includes an elliptical cylindrical mirror means 40 for directing light evenly along the scanning line 18. The mirror means 40 has a first focal line 42 and a second focal line 44 (shown as points in FIG. 3). The mirror means 40 includes a first elliptical cylindrical section 40-1 having the first focal line 42 adjacent thereto and a second elliptical section 40-2 having the second focal line 44 adjacent thereto as shown in FIG. 3. The first and second elliptical, cylindrical sections 40-1 and 40-2, respectively, are shown in cross-section in FIG. 3 to show their relationship to portions of the associated ellipse 46 and to each other. The first and second focal lines 42 and 44, respectively, are located on the major diameter 48 of the ellipse 46. The first and second elliptical, cylindrical sections (hereinafter referred to as cylindrical sections 40-1 and 40-2), respectively, are positioned and secured in the frame 26 so that the associated major diameter 48 lies at an angle of about thirty degrees with respect to the optical axis 34 in the embodiment described. The optical axis 34 is positioned substantially perpendicularly to the scanning plane 16 at the scanning line 18 thereof. Notice that the optical axis 34 passes between the cylindrical sections 40-1 and 40-2 as shown in FIGS. 1 and 3.

Figure 2:
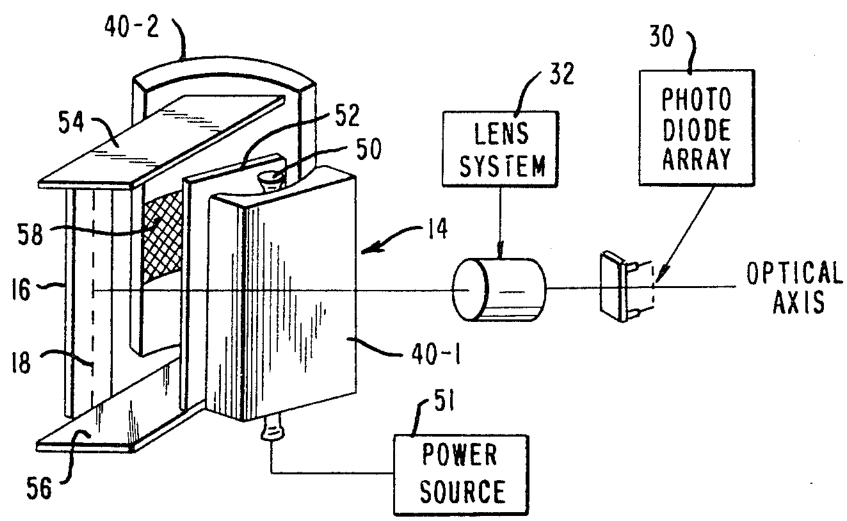
FIG. 2 is a side view, in perspective, of the apparatus shown in FIG. 1 with certain portions of the system shown in FIG. 1 removed to simplify the showing.
Figure 3:
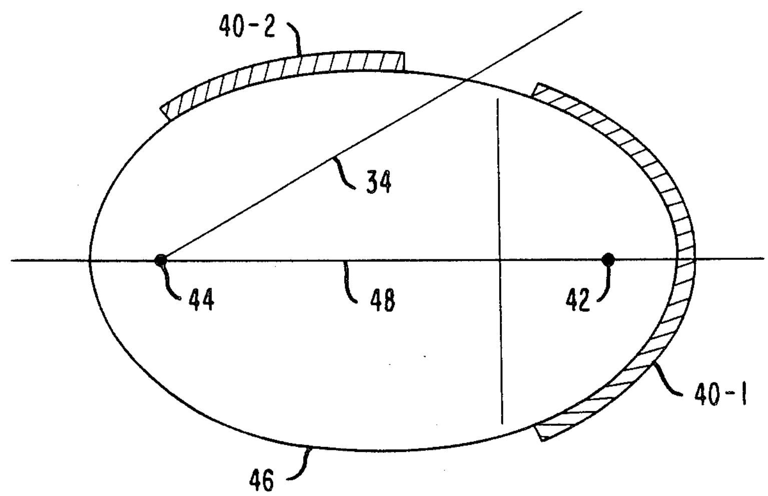
FIG. 3 is a schematic view of a cross-section of an elliptical cylindrical mirror shown in FIGS. 1 and 2.

The illuminating apparatus 14 also includes a linear-type lamp 50 (FIGS. 1, 2) which is positioned at the first focal line 42 adjacent to the cylindrical section 40-1 so that the length of the lamp 50 extends along the length of the cylindrical section 40-1 as shown best in FIG. 2. The lamp 50 used in the embodiment described is a halogen-type, linear-coil filament lamp, being a CGE Watt-Miser Quartzline Lamp Q500/350 WM which is manufactured by The General Electric Company. The lamp 50 is connected to an appropriate power source 51. As of the filing date of this application, the lamp 50 costs about $40 and its operating life is about 2000 hours; however, it produces an infra-red component of light which must be screened out to avoid heat damage to the document 12. Other lamps which are similar but which generate a lower, infra-red component cost about $135 per lamp and have an average operating life of about 50 hours. In order to screen out the infra-red component when using the cheaper of the two lamps mentioned, a "hot mirror" 52, consisting of an infra-red reflector, is used. The hot mirror 52 is positioned between lamp 50 and the cylindrical section 40-2 so as to screen out or prevent the infra-red component from reaching the cylindrical section 40-2 and thereby avoid heat damage to the documents 12.

The cylindrical section 40-2, which is part of the illuminating apparatus 14, is positioned relative to the cylindrical section 40-1 so that the second focal line 44 (FIG. 3) associated with the elliptical cylindrical mirror means 40 (as portrayed by the ellipse 46) is substantially coincident with the scanning line 18 located in the scanning plane 16. Thus, the cylindrical sections 40-1 and 40-2 cooperate to direct light from the lamp 50 to the scanning line 18 to illuminate the portion of the document being imaged.

In order to illuminate the scanning line 18 evenly, the illuminating apparatus 14 also includes first and second planar mirrors 54 and 56, respectively, which are fixed to the frame 26. These mirrors 54 and 56 are rectangular in shape and are positioned in spaced, parallel relationship to each other, and they are also positioned perpendicularly to the scanning line 16. The long dimensions of the mirrors 54 and 56 are positioned parallel to the scanning plane 18.

Figure 4:
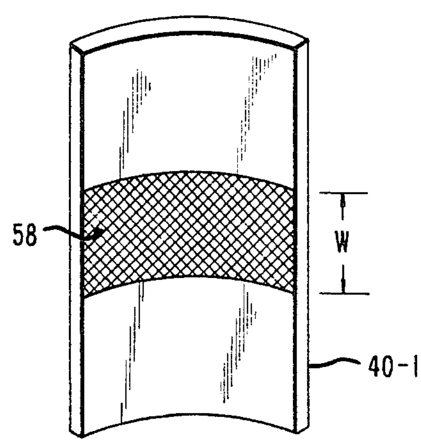
FIG. 4 is a general perspective view of one of the elliptical, cylindrical mirrors shown in FIGS. 1 and 2.

A special feature of the illuminating apparatus 14 is the use of the cylindrical section 40-2 in conjunction with the cylindrical section 40-1. These cylindrical sections 40-1 and 40-2 may be made of brass with an aluminum reflective coating thereon, for example. The cylindrical section 40-2 has a non-reflecting area 58 thereon which faces the scanning line 18 and which is located at the center of the cylindrical section 40-2 as measured along the length of the second focal line 44. The width of the non-reflecting area 58, as measured along the second focal line 44 and as shown by the dimension W in FIG. 4, is about 25 mm or one inch.

In order to show the advantages of the illuminating apparatus 14, it is useful to refer to the observed oscilloscope waveforms when using different combinations of the elements included in the apparatus 14. A white document 12 with a diffuse surface was placed at the scanning line 18, and the output of the photodiode or detector array 30 or comparable solid state camera was connected to an oscilloscope. The waveforms of the oscilloscope are shown in FIGS. 5A, 5B, 5C and 5D; these waveforms were obtained with a power source of 110 volts at 2.5 amperes, a lens aperture of F 2.8 with the lens system 32, and a volt/division setting of 0.5 on the oscilloscope voltage scale. The analog waveforms shown in FIGS. 5A, 5B, 5C and 5D show a 0% to 100% range of the detectors' outputs, with the left side of each waveform representing the bottom of the scanning line 18 (as viewed in FIG. 2) and with the right side of each waveform correspondingly representing the top of the scanning line 18. The center of the scanning line 18 is represented by the vertical center line of each of the FIGS. 5A, 5B, 5C and 5D.

Figure 5C:
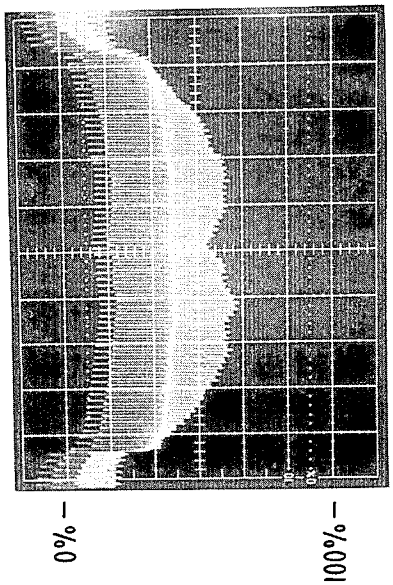
FIGS. 5A, 5B, 5C and 5D are oscilloscope waveforms which represent different combinations of components included in the imaging apparatus shown in FIG. 1.
Figure 5D:
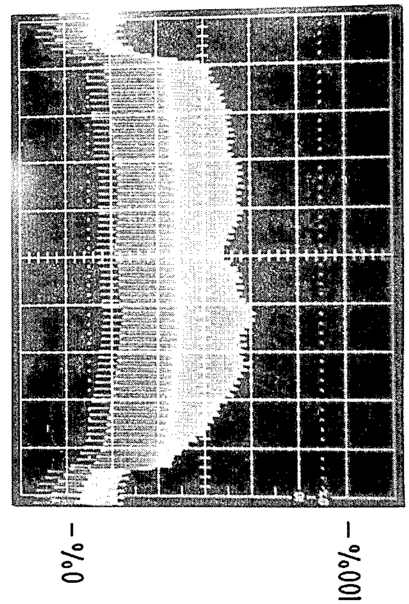
Figure 5A:
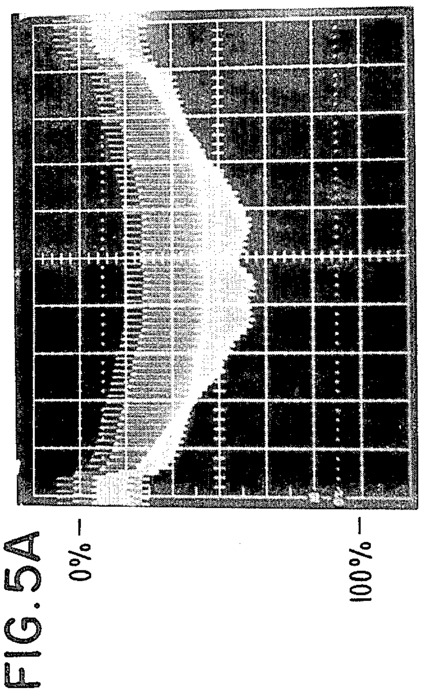

The oscilloscope waveform shown in FIG. 5A shows the light distribution at the scanning line 18 when using only the first elliptical cylindrical section 40-1 and not using cylindrical section 40-2, planar mirror 54 or planar mirror 56. Notice that the center of the waveform corresponding to the center of the scanning line 18 is illuminated to a brighter degree than either the right side of the waveform corresponding to the top of the scanning line 18 or the left side of the waveform corresponding to the bottom of the scanning line 18.

Figure 5B:
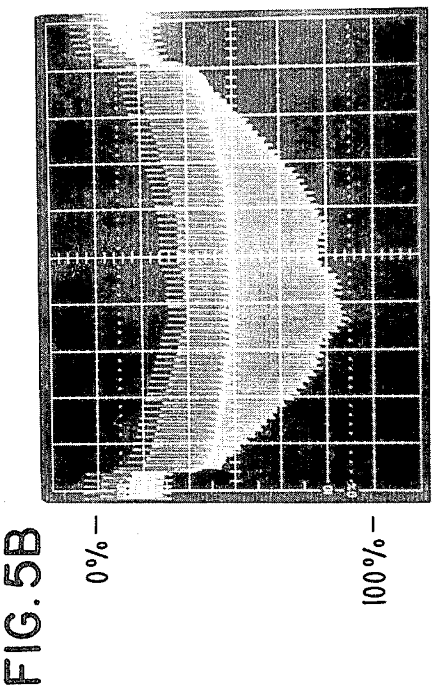

The oscilloscope waveform shown in FIG. 5B shows the light distribution at the scanning line 18 when using only the cylindrical sections 40-1 and 40-2, with no non-reflecting area (like 58) on the cylindrical section 40-2. Notice that the center of the waveform corresponding to the center of the scanning line 18 is illuminated to a higher degree than it is with the setup represented by FIG. 5A; however, the illumination at the center of the scanning line 18 (FIG. 5B) is unacceptably too high relative to its ends.

The oscilloscope waveform shown in FIG. 5C shows the light distribution at the scanning line 18 when using only the cylindrical sections 40-1 and 40-2; however, the cylindrical section 40-2 is provided with the non-reflecting surface 58 as shown in FIG. 4. Notice that the intensity of light at the center of the waveform corresponding to the center of the scanning line 18 is distributed more evenly than it is with the setup portrayed by FIG. 5B which includes cylindrical sections 40-1 and 40-2 with no non-reflecting surface 58.

The oscilloscope waveform shown in FIG. 5D shows the light distribution at the scanning line 18 when using the cylindrical sections 40-1 and 40-2 (with the non-reflecting area 58 included thereon) and the first planar mirror 54 located near the top of the scanning line 18. Notice that the light intensity levels at the center and right side of the waveform, corresponding to the center and top of the scanning line 18, are substantially constant. Notice also that the light intensity level at the left side of the waveform, corresponding to the bottom of the scanning line 18, is less than the light intensity levels at the center and right side of the waveform; this is due to the fact that the bottom or second planar mirror 56 was not included in the setup used to obtain the waveform shown in FIG. 5D.

From what has been discussed in relation to FIGS. 5A–5D, it is apparent that the level of illumination at the scanning line 18, as represented by the illuminating apparatus 14 shown in FIG. 1, is substantially constant along the length thereof. This feature minimizes thresholding problems, as discussed earlier herein, and also provides for a more accurate representation of the document 12 being imaged.

Figure 6:
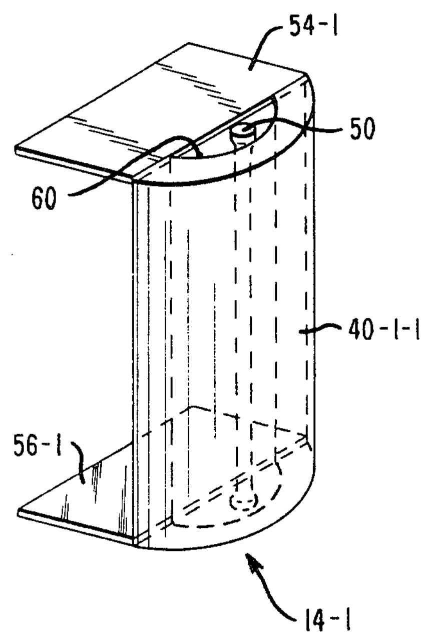
FIG. 6 is a schematic view, in perspective, of a portion of the illuminating apparatus shown in FIG. 1.

FIG. 6 shows a second embodiment of a portion of the illuminating apparatus shown in FIG. 1, and this apparatus is designated generally as 14-1. The apparatus 14-1 includes a first elliptical, cylindrical section 40-1-1, a first planar mirror 54-1 and a second planar mirror 56-1 which correspond to the cylindrical section 40-1, the first planar mirror 54, and the second planar mirror 56, respectively, as previously discussed. The planar mirrors 54-1 and 56-1 are conventionally secured to the cylindrical section 40-1-1 to be substantially parallel to each other and perpendicular to the linear lamp 50.

One of the features of the apparatus 14-1 is that the components shown in FIG. 6 (excluding the lamp 50) can be manufactured as a unitary or single-piece construction. Another feature is that the material from which the apparatus 14-1 is made can be made from dichroic material which would screen out the infra-red components from the lamp 50 and eliminate the need for a separate hot mirror 52 shown in FIG. 1.

The apparatus 14-1 also has an opening 60 therein to facilitate the insertion or removal of lamp 50. Naturally, the apparatus 14-1 would be used with a cylindrical section 40-2 in a setup corresponding to that shown in FIG. 1.

What is claimed is:

1. Apparatus for illuminating an object comprising:
a scanning plane having a scanning line therein;
means for presenting said object at said scanning plane; and
an elliptical cylindrical mirror means for directing light evenly on said object along said scanning line;
said elliptical cylindrical mirror means having first and second focal lines and comprising:
a first elliptical cylindrical section having said first focal line adjacent thereto; and
a second elliptical cylindrical section having said second focal line adjacent thereto and also cooperating with said first elliptical cylindrical section for directing light from said first focal line to said second focal line;
said elliptical cylindrical mirror means being positioned relative to said scanning plane to enable said second focal line to be substantially coincident with said scanning line;
said second elliptical cylindrical section having a non-reflecting area facing said second focal line and being located substantially at the center of said second elliptical cylindrical section as measured along the length of said second focal line;
first and second planar mirrors located in substantially spaced parallel relationship to each other at opposed ends of said scanning line at said scanning plane and positioned substantially perpendicular to said scanning plane; and
a linear-type source of illumination positioned at said first focal line.

2. The apparatus as claimed in claim 1 in which said source of illumination is a lamp having a linear coil filament which may produce infra-red light in addition to visible light, and in which said elliptical cylindrical mirror means includes directing means for directing said infra-red light away from said scanning plane.

3. The apparatus as claimed in claim 2 in which said directing means includes material added to said elliptical cylindrical mirror means and said first and second planar mirrors to make said elliptical cylindrical mirror means and said first and second planar mirrors dichroic.

4. The apparatus as claimed in claim 3 in which said first elliptical cylindrical section and said first and second planar mirrors are made of a single piece construction.

5. The apparatus as claimed in claim 2 in which said directing means includes a hot mirror positioned between said source of illumination and said scanning plane.

6. The apparatus as claimed in claim 5 in which said source of illumination is a tungsten-halogen lamp.

7. The apparatus as claimed in claim 6 in which the length of said linear coil filament is about one-half the length of said scanning plane as measured in a direction along said scanning line.

8. The apparatus as claimed in claim 7 in which said elliptical cylindrical mirror means has a major axis with said first and second focal lines being located thereon, and in which said major axis is displaced from said optical axis by an angle of approximately 30 degrees.

9. A system for imaging documents comprising:

a scanning plane having a scanning line therein;

means for presenting a said document at said scanning plane;

an elliptical cylindrical mirror means for directing light evenly on said document along said scanning line;

said elliptical cylindrical mirror means having first and second focal lines and comprising:

a first elliptical cylindrical section having said first focal line adjacent thereto; and a second elliptical cylindrical section having said second focal line adjacent thereto and also cooperating with said first elliptical cylindrical section for directing light from said first focal line to said second focal line;

said elliptical cylindrical mirror means being positioned relative to said scanning plane to enable said second focal line to be substantially coincident with said scanning line;

said second elliptical cylindrical section having a non-reflecting area facing said second focal line and being located substantially at the center of said second elliptical cylindrical section as measured along the direction of said second focal line;

first and second planar mirrors located in substantially spaced parallel relationship to each other at opposed ends of said scanning line at said scanning plane and positioned substantially perpendicular to said scanning plane;

a linear-type source of illumination positioned at said first focal line;

an optical axis which is located substantially perpendicularly to said scanning plane at said scanning line and passes between said first and second elliptical cylindrical sections;

a light detector array located on said optical axis; and a lens system located on said optical axis for directing light reflected from said document along said scanning line to said light detector array.

10. The system as claimed in claim 9 in which said source of illumination is a lamp having a linear, coil filament which may produce infra-red light in addition to visible light, and in which said elliptical cylindrical mirror means includes directing means for directing said infra-red light away from said scanning plane.

11. The system as claimed in claim 10 in which said directing means includes material added to said elliptical cylindrical mirror means and said first and second planar mirrors to make said elliptical cylindrical mirror means and said first and second planar mirrors dichroic.

12. The system as claimed in claim 11 in which said first elliptical cylindrical section and said first and second planar mirrors are made of a single piece construction.

13. The system as claimed in claim 10 in which said directing means includes a hot mirror positioned between said source of illumination and said scanning plane.

14. The system as claimed in claim 13 in which said source of illumination is a tungsten-halogen lamp.

15. The system as claimed in claim 14 in which the length of said linear coil filament is about one-half the length of said scanning plane as measured in a direction along said scanning line.

16. The system as claimed in claim 15 in which said elliptical cylindrical mirror means has a major axis with said first and second focal lines being located thereon, and in which said major axis is displaced from said optical axis by an angle of approximately 30 degrees.

* * * * *